United States Patent
Nakata

(10) Patent No.: US 11,338,619 B2
(45) Date of Patent: May 24, 2022

(54) PNEUMATIC TIRE

(71) Applicant: BRIDGESTONE CORPORATION, Tokyo (JP)

(72) Inventor: Yoshiki Nakata, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 177 days.

(21) Appl. No.: 16/772,803

(22) PCT Filed: Dec. 3, 2018

(86) PCT No.: PCT/JP2018/044429
§ 371 (c)(1),
(2) Date: Jun. 15, 2020

(87) PCT Pub. No.: WO2019/124037
PCT Pub. Date: Jun. 27, 2019

(65) Prior Publication Data
US 2021/0162816 A1 Jun. 3, 2021

(30) Foreign Application Priority Data
Dec. 20, 2017 (JP) .............................. JP2017-244475

(51) Int. Cl.
*B60C 11/12* (2006.01)
*B60C 11/03* (2006.01)
*B60C 11/00* (2006.01)

(52) U.S. Cl.
CPC ...... *B60C 11/1259* (2013.01); *B60C 11/1218* (2013.01); *B60C 11/1272* (2013.01); *B60C 2011/0033* (2013.01); *B60C 2011/129* (2013.01)

(58) Field of Classification Search
CPC ................. B60C 11/1218; B60C 11/12; B60C 2011/0033; B60C 11/00–14;
(Continued)

(56) References Cited

U.S. PATENT DOCUMENTS 4,230,512 A 10/1980 Makino et al.
2004/0154716 A1 8/2004 Kimishima et al.
(Continued)

FOREIGN PATENT DOCUMENTS

CN 1521023 A 8/2004
CN 104339986 A 2/2015
(Continued)

OTHER PUBLICATIONS

JP 2005193770 Machine Translation, Wada, Junichiro (Year: 2005).*
(Continued)

*Primary Examiner* — Robert C Dye
*Assistant Examiner* — Nicholas J Weiler
(74) *Attorney, Agent, or Firm* — Kenja IP Law PC

(57) ABSTRACT

Provided is pneumatic tire in which a land portion includes a width direction sipe extending in a tread width direction, the width direction sipe includes, in a cross section along a depth direction, a linear portion extending from an opening of the width direction sipe toward a bottom of the width direction sipe, and a bent portion connected to the linear portion, bending and extending from a connecting portion with the linear portion to the bottom of the width direction sipe, and the linear portion of the width direction sipe has a length in the depth direction increasing as the linear portion extends from a center portion of the width direction sipe in the tread width direction toward an end portion in the tread width direction.

14 Claims, 2 Drawing Sheets

(58) Field of Classification Search
CPC ....... B60C 2011/129; B60C 2011/1295; B60C 11/1281; B60C 11/1222
See application file for complete search history.

(56) References Cited

U.S. PATENT DOCUMENTS

| | | | |
|---|---|---|---|
| 2014/0158264 A1* | 6/2014 | Kiwaki | B60C 11/0309 |
| | | | 152/209.18 |
| 2014/0261936 A1 | 9/2014 | Iwamura | |
| 2016/0114630 A1* | 4/2016 | Saeki | B60C 11/1218 |
| | | | 152/209.18 |
| 2016/0243898 A1* | 8/2016 | Ito | B60C 11/033 |
| 2018/0154700 A1 | 6/2018 | Sakurai | |
| 2021/0331526 A1* | 10/2021 | Kishizoe | B60C 11/1236 |

FOREIGN PATENT DOCUMENTS

| | | | | |
|---|---|---|---|---|
| DE | 102014220977 A1 | | 4/2016 | |
| EP | 3015289 A1 | | 5/2016 | |
| JP | S6144008 A | | 3/1986 | |
| JP | 2005193770 A | * | 7/2005 | ......... B60C 11/1218 |
| JP | 2011105135 A | | 6/2011 | |
| JP | 2012041024 A | | 3/2012 | |
| JP | 2014177237 A | | 9/2014 | |
| JP | 2015003703 A | * | 1/2015 | ......... B60C 11/1218 |
| JP | 2015003703 A | | 1/2015 | |
| JP | 2016016720 A | | 2/2016 | |
| NZ | 212987 A | | 10/1986 | |
| WO | 2014207981 A1 | | 12/2014 | |
| WO | 2016190144 A1 | | 12/2016 | |

OTHER PUBLICATIONS

JP 2015003703 Machine Translation, Saeki, Kentaro (Year: 2015).*
Jan. 8, 2019, International Search Report issued in the International Patent Application No. PCT/JP2018/044429.
Jun. 23, 2020, International Preliminary Report on Patentability issued in the International Patent Application No. PCT/JP2018/044429.
Jul. 28, 2021, search result of the Extended European Search Report issued by the European Patent Office in the corresponding European Patent Application No. 18891375.0.
Sep. 23, 2021, search result of Office Action issued by the China National Intellectual Property Administration in the corresponding Chinese Patent Application No. 201880080077.0.

* cited by examiner

PNEUMATIC TIRE

TECHNICAL FIELD

The present disclosure relates to a pneumatic tire.

BACKGROUND

Heretofore, a pneumatic tire has been suggested in which sipes extending in a tread width direction are provided in rib-like land portions partitioned by circumferential main grooves extending in a tread circumferential direction.

According to this pneumatic tire, while a running performance on a dry road surface is obtained by the rib-like land portions having a high rigidity, an effect of removing water film is obtained by the sipes, and the running performance on a wet road surface also can be obtained.

However, in such a pneumatic tire as described above, the sipes are provided in the land portions, and hence there are problems that shearing rigidity of each land portion decreases and that wear resistance decreases. To solve these problems, a technique is also suggested in which rigidity of a land portion is obtained by use of the so-called three-dimensional sipe bending and extending in a sipe depth direction as the sipe to be provided in the land portion (see Patent Literature 1, for example).

CITATION LIST

Patent Literature

PTL 1: Japanese Patent Laid-Open No. 2016-016720

SUMMARY

Technical Problem

However, even in the case where the so-called three-dimensional sipe as described above is used, wear resistance might be insufficient.

To solve this problem, an object of the present disclosure is to provide a pneumatic tire having an improved wear resistance.

Solution to Problem

A gist configuration of the present disclosure is as follows.

A pneumatic tire of the present disclosure includes, in a tread surface, two or more circumferential main grooves extending in a tread circumferential direction, and a land portion partitioned between the circumferential main grooves or by one of the circumferential main grooves and a tread edge, wherein the land portion includes a width direction sipe extending in a tread width direction, the width direction sipe includes, in a cross section along a depth direction, a linear portion extending from an opening of the width direction sipe toward a bottom of the width direction sipe, and a bent portion connected to the linear portion, bending and extending from a connecting portion with the linear portion to the bottom of the width direction sipe, and the linear portion of the width direction sipe has a length in the depth direction increasing as the linear portion extends from a center portion of the width direction sipe in the tread width direction toward an end portion in the tread width direction.

Here, "extending in the tread circumferential direction" refers to inclining and extending at an angle of 5° or less relative to the tread circumferential direction, and includes, for example, not only linearly extending but also extending in a zigzag or curved shape.

Furthermore, the "tread edge" refers to an outermost edge of a portion of a tire outer circumferential surface in the tire width direction, the portion being to be brought into contact with a road surface, in the case where the tire is rolled in a state of being mounted to a rim, charged with a prescribed internal pressure and loaded with a maximum load.

Additionally, the "sipe" refers to a sipe having an opening width of 0.5 mm or less to the tread surface in a state where the tire is mounted to the rim, charged with the prescribed internal pressure, and unloaded. Note that the opening width to the tread surface is preferably 0.3 mm or less. In addition, "bend" includes a zigzag shape, a curved shape or another shape.

Here, the "rim" indicates an approved rim (a Measuring Rim in Standards Manual of ETRTO, and a Design Rim in Year Book of TRA) in an applicable size described or to be described in future in an industrial standard effective in a region where the tire is produced and used, for example, JATMA Year Book of JATMA (the Japan Automobile Tyre Manufacturers Association) in Japan, Standards Manual of ETRTO (the European Tyre and Rim Technical Organization) in Europe, Year Book of TRA (the Tire and Rim Association, Inc.) in U.S. or the like (that is, the above "rim" also includes a size that can be included in the above industrial standard in future, in addition to the existing size. Examples of "the size to be described in future" include sizes described as "FUTURE DEVELOPMENTS" in 2013 edition of the manual of ETRTO). However, in the case of a size that is not described in the above industrial standard, the rim refers to a rim having a width corresponding to a bead width of the tire.

Furthermore, "a prescribed internal pressure" indicates an air pressure (a maximum air pressure) corresponding to a maximum load capability of a single wheel in an applicable size and ply rating described in the above standard of JATMA or the like. In the case of a size that is not described in the above industrial standard, "the prescribed internal pressure" refers to an air pressure (the maximum air pressure) corresponding to the maximum load capability prescribed for each vehicle to which the tire is mounted. Additionally, "the maximum load" refers to a load corresponding to the above maximum load capability.

In the present description, "a width We of an internal land portion in the tread width direction" is a maximum width in the tread width direction in the case where the width is not constant.

Furthermore, "a tread gauge Dc of the internal land portion" is a thickness on an outer side in a tire radial direction from a tire reinforcement member (a belt layer, a belt reinforcement layer or the like) on an outermost side in the tire radial direction, and the gauge refers to a maximum gauge in the tire radial direction.

In the present description, "a width Ws of a shoulder-side land portion in the tread width direction" is a maximum width in the tread width direction in the case where the width is not constant.

Additionally, "a tread gauge Ds of the shoulder-side land portion" is a thickness on the outer side in the tire radial direction from the tire reinforcement member (the belt layer, the belt reinforcement layer or the like) on the outermost side in the tire radial direction, and the gauge refers to a maximum gauge in the tire radial direction.

Advantageous Effect

According to the present disclosure, a pneumatic tire having an improved wear resistance can be provided.

DETAILED DESCRIPTION

Hereinafter, an embodiment of the present disclosure will be illustratively described in detail with reference to the drawings.

Figure 1:
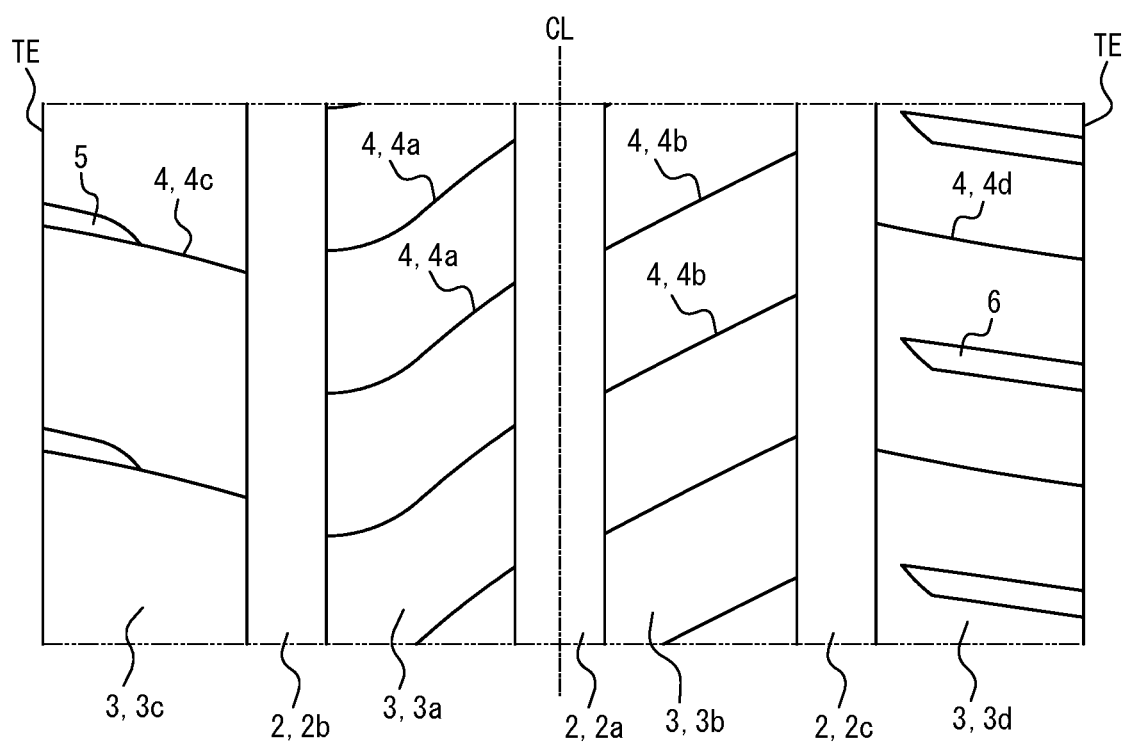
FIG. 1 is a tread developed view illustrating a tread surface 1 of a pneumatic tire according to an embodiment of the present disclosure.

FIG. 1 is a tread developed view illustrating a tread surface 1 of a pneumatic tire (hereinafter, also referred to simply as the tire) according to an embodiment of the present disclosure.

As illustrated in FIG. 1, this tire includes, in the tread surface 1, two or more (in an illustrated example, three) circumferential main grooves 2 extending in a tread circumferential direction, and a rib-like land portion 3 partitioned between the circumferential main grooves 2 or by one of the circumferential main grooves 2 and a tread edge TE (not partitioned by a groove other than an after-mentioned width direction sipe 4). In the illustrated example, one circumferential main groove 2a extends on a tire equatorial plane CL, and circumferential main grooves 2b, 2c are provided on both sides of the circumferential main groove 2a in a tread width direction.

Here, a groove width of each of the circumferential main grooves 2 is not especially limited, but can be from 5 to 20 mm. Furthermore, in the present disclosure, a groove depth (a maximum depth) of the circumferential main groove 2 is preferably 6.5 mm or less, and further preferably 6.0 mm or less. This is because rigidity of the land portion 3 can be obtained, and wear resistance can further improve. Note that in view of a drainage performance, a groove depth (a maximum depth) of the circumferential main groove 2 is preferably 5.5 mm or more.

Here, as illustrated in FIG. 1, the tire of the present embodiment includes four land portions in total, specifically land portions 3a, 3b each of which is partitioned between the circumferential main grooves 2, and land portions 3c, 3d each of which is partitioned by the circumferential main groove 2 and the tread edge TE.

As illustrated in FIG. 1, each land portion 3 includes width direction sipes 4 extending in the tread width direction. The land portion 3a includes width direction sipe 4a extending across the land portion 3a in the tread width direction, and a plurality of width direction sipes 4a are arranged via a predetermined pitch interval in a tread circumferential direction. Each of the width direction sipes 4a includes a first portion located in one half portion in the tread width direction and extending from the circumferential main groove 2b in an inwardly curved manner in the tread width direction, and a second portion connected to the first portion, extending linearly while inclining relative to the tread width direction, and connected to the circumferential main groove 2a extending on the tire equatorial plane CL. The second portion is not especially limited, but may incline at an angle from 15 to 50° relative to the tread width direction.

The land portion 3b includes width direction sipe 4b extending across the land portion 3b in the tread width direction, and a plurality of width direction sipes 4b are arranged via a predetermined pitch interval (in the example illustrated in FIG. 1, substantially the same pitch interval as in the width direction sipes 4a of the land portion 3a) in the tread circumferential direction. In this example, the width direction sipe 4b linearly extends inclining relative to the tread width direction. The width direction sipe 4b is not especially limited, but may incline at an angle from 15 to 50° relative to the tread width direction.

The land portion 3c includes width direction groove 5 extending inwardly from the tread edge TE in the tread width direction while inclining relative to the tread width direction, to terminate in the land portion 3c, and width direction sipe 4c which extends from a terminal end of the width direction groove 5 inclining inwardly in the tread width direction and relative to the tread width direction, to communicate with the circumferential main groove 2b. A plurality of width direction grooves 5 and a plurality of width direction sipes 4c are arranged via a predetermined pitch interval (in the example illustrated in FIG. 1, substantially twice as large as the pitch interval of the width direction sipes 4a of the land portion 3a and as large as the pitch interval of the width direction sipes 4b of the land portion 3b) in the tread circumferential direction. The width direction grooves 5 and the width direction sipes 4c are not especially limited, but may incline at an angle from 0 to 20° relative to the tread width direction. Furthermore, there are not any special limits on a groove width of the width direction groove 5, but the groove width may be, for example, from 1 to 4 mm. There are not any special limits on a groove depth (a maximum depth) of the width direction groove 5, but the groove depth may be, for example, from 3 to 5 mm.

In this example, the width direction groove 5 does not communicate with the circumferential main groove 2a, and terminates in the land portion 3c, and the pitch interval in the tread circumferential direction is set to be larger than in the land portions 3a, 3b in which only the width direction sipes 4a, 4b are arranged as described above. Consequently, rigidity of the land portion 3c is obtained. Furthermore, a difference in rigidity from the land portion 3a or the land portion 3b that does not include the width direction grooves 5 is decreased, to obtain wear resistance and uneven wear resistance.

The land portion 3d includes width direction groove 6 extending inwardly from the tread edge TE in the tread width direction while inclining relative to the tread width direction, to terminate in the land portion 3c. Furthermore, the land portion 3d includes width direction sipe 4d extending from the tread edge TE inwardly in the tread width direction while inclining relative to the tread width direction, to communicate with the circumferential main groove 2a. A plurality of width direction grooves 5 and a plurality of width direction sipes 4c are arranged alternately in the tread circumferential direction via a predetermined pitch interval (in the example illustrated in FIG. 1, substantially the same as the pitch interval of the width direction sipes 4a of the land portion 3a and as the pitch interval of the width direction sipes 4b of the land portion 3b). Consequently, balance in rigidity of the land portion 3d can be obtained. The width direction grooves 6 and the width direction sipes 4d may incline at an angle from 0 to 20° relative to the tread width direction. Furthermore, there are not any special limits on a groove width of the width direction grooves 6, but the groove width can be, for example, from 1 to 4 mm. There are not any special limits on a groove depth (a maximum depth) of the width direction groove 6, but the groove depth can be, for example, from 3 to 5 mm.

In this example, the width direction groove 6 does not communicate with the circumferential main groove 2c, but terminates in the land portion 3d. Furthermore, the width direction grooves 6 and the width direction sipes 4d are arranged alternately in the tread circumferential direction. Consequently, the rigidity of the land portion 3d can be obtained. Furthermore, a difference in rigidity from the land portion 3a or the land portion 3b that does not include the width direction groove 6 is decreased, to obtain wear resistance and uneven wear resistance.

Here, the width direction sipes 4a, 4b will be described in more detail.

Figure 2:
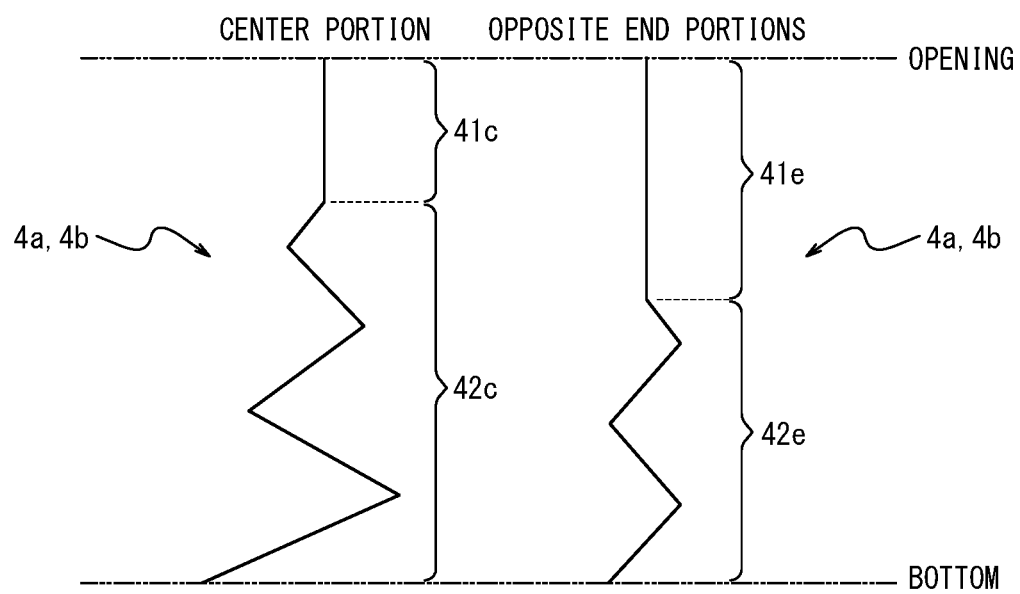
FIG. 2 illustrates respective cross-sectional shapes along a sipe depth direction, of a width direction sipe 4a, 4b of the tire of the embodiment of the present disclosure, in a center portion in a tread width direction and opposite end portions in the tread width direction.

FIG. 2 illustrates respective cross-sectional shapes along a sipe depth direction, of the width direction sipe 4a, 4b of the tire of the embodiment of the present disclosure, in a center portion in a tread width direction and opposite end portions in the tread width direction.

As illustrated in FIG. 2, the width direction sipe 4a, 4b includes, in a cross section along a depth direction, linear portion 41c, 41e extending from an opening of the width direction sipe 4a, 4b toward a bottom of the width direction sipe 4a, 4b, and bent portion 42c, 42e connected to the linear portion 41c, 41e bending and extending from a connecting portion with the linear portion 41c, 41e to the bottom of the width direction sipe. Furthermore, as illustrated in FIG. 2, in the linear portion 41c, 41e of the width direction sipe 4a, 4b, a length of the width direction sipe 4a, 4b in the depth direction increases from the center portion of the width direction sipe 4a, 4b in the tread width direction toward the end portion (the opposite end portions) in the tread width direction. In the present embodiment, the linear portion 41c, 41e of the width direction sipe 4a, 4b has a constant first length in the center portion of the width direction sipe 4a, 4b in the tread width direction (in this example, a center position of an extending length of the width direction sipe), and a length of the linear portion gradually increases from an inflection point at the center position. The linear portion has a constant second length larger than the first length in the end portion of the width direction sipe 4a, 4b in the tread width direction (in this example, an end of the width direction sipe), and the end is an end point of inflection. Note that in the present embodiment, the inflection point is the center position of the extending length of the width direction sipe, and the inflection point may be any point within a region being at a center of the extending length of the width direction sipe and having a length of 60% of the extending length. Furthermore, in the present embodiment, the end point of the inflection is the end of the width direction sipe, but the end point of the inflection may be within a region being at each end of the extending length of the width direction sipe and having a length of 20% of the extending length. In this case, the linear portion can have a constant length on an outer side of the end point of the inflection in the width direction.

Note that when "a length of the width direction sipe 4a, 4b in the depth direction increases from the center portion of the width direction sipe 4a, 4b in the tread width direction toward the end portion (the opposite end portions) in the tread width direction", it is meant that the width direction sipe does not include a region where the length of the width direction sipe 4a, 4b in the depth direction decreases from the center portion of the width direction sipe 4a, 4b in the tread width direction toward the end portion (the opposite end portions) in the tread width direction. For example, in the present disclosure, the linear portion 41c, 41e of the width direction sipe 4a, 4b can be configured in such a manner that the length of the width direction sipe 4a, 4b in the depth direction gradually increases from the center portion of the width direction sipe 4a, 4b in the tread width direction toward the end portion (the opposite end portions) in the tread width direction.

As illustrated in FIG. 2, according to the present embodiment, in the cross section along the depth direction, the bent portion 42c, 42e of the width direction sipe 4a, 4b includes two or more (in the illustrated example, four) apexes in the center portion of the width direction sipe 4a, 4b in the tread width direction. In the end portion (the opposite end portions) of the width direction sipe 4a, 4b in the tread width direction, a number of apexes (in the illustrated example, three) is smaller than a number of the apexes in the center portion in the tread width direction.

As illustrated in FIG. 2, in the bent portion 42c, 42e of the width direction sipe 4a, 4b, in the center portion of the width direction sipe 4a, 4b in the tread width direction, an amplitude that is a distance between an extension line (illustrated with a dotted line) of the linear portion 41c, 41e and the apex of the bent portion 42c, 42e or the end portion of the width direction sipe 4a, 4b on a bottom side varies to be larger on the bottom side of the width direction sipe 4a, 4b than on an opening side of the width direction sipe 4a, 4b. In the illustrated example, the amplitude gradually increases from the opening side of the width direction sipe 4a, 4b toward the bottom side of the width direction sipe 4a, 4b. Furthermore, the amplitude is constant in the end portion of the width direction sipe 4a, 4b in the tread width direction.

Hereinafter, operations and effects of the pneumatic tire of the present embodiment will be described.

According to the pneumatic tire of the present embodiment, a length of the linear portion 41c in the depth direction of the width direction sipe 4a, 4b is relatively small in the center portion of the width direction sipe 4a, 4b along the tread width direction, in which a swelling amount of a rubber of a block piece partitioned by the width direction sipe 4a, 4b, when the tire is loaded. Consequently, a contact amount between sipe wall surfaces can increase, and an effect of engaging the sipe wall surfaces with each other can be enhanced. Therefore, the rigidity of the land portion 3a, 3b can be increased, and the wear resistance of the tire can be improved. Particularly according to the present embodiment, in the bent portion 42c, 42e, the number of the apexes in the center portion of the width direction sipe 4a, 4b in the tread width direction is larger than in the end portion in the tread width direction. Consequently, the above contact amount between the sipe wall surfaces can increase, and the effect of engaging the sipe wall surfaces with each other can be further enhanced. Furthermore, according to the present embodiment, in the bent portion 42c, 42e of the width direction sipe 4a, 4b, in the center portion of the width direction sipe 4a, 4b in the tread width direction, the above amplitude varies to be larger on the bottom side of the width direction sipe 4a, 4b than on the opening side of the width direction sipe 4a, 4b. Consequently, the above contact amount between the sipe wall surfaces can increase, and the effect of engaging the sipe wall surfaces with each other can be further enhanced.

Thus, according to the pneumatic tire of the present embodiment, the wear resistance of the tire can be improved.

According to the present disclosure, as in the above embodiment, in the cross section along the depth direction, the bent portion 42c, 42e of the width direction sipe 4a, 4b preferably includes two or more apexes in the center portion of the width direction sipe 4a, 4b in the tread width direction, and in the end portion of the width direction sipe 4a, 4b in the tread width direction, the number of the apexes is preferably smaller than the number of the apexes in the center portion in the tread width direction. This is because the above contact amount between the sipe wall surfaces can increase, the effect of engaging the sipe wall surfaces with each other can be further enhanced, and the wear resistance of the tire can further improve. In the above embodiment, the width direction sipe includes the center portion including four apexes in the tread width direction, and the end portion including three apexes in the tread width direction. However, various modifications are possible to such an extent that the number of the apexes does not increase from the center portion in the tread width direction toward the end portion in the tread width direction. As an example, the center portion in the tread width direction may be further divided into two regions, to form a region where the number of the apexes is, for example, five and a region where the number of the apexes is, for example, four (the region including five apexes is a region closer to a tread center side). Furthermore, the end portion in the tread width direction may be further divided into two regions, to form a region where the number of the apexes is, for example, three and a region where the number of the apexes is, for example, two (the region including three apexes is a region closer to the tread center side).

According to the present disclosure, as in the above embodiment, in the bent portion 42c, 42e of the width direction sipe 4a, 4b, in the center portion of the width direction sipe 4a, 4b in the tread width direction, the amplitude that is the distance between the extension line of the linear portion 41c, 41e and the apex of the bent portion 42c, 42e or the end portion of the width direction sipe 4a, 4b on the bottom side preferably varies to be larger on the bottom side of the width direction sipe 4a, 4b than on the opening side of the width direction sipe 4a, 4b. This is because the above contact amount between the sipe wall surfaces can increase, the effect of engaging the sipe wall surfaces with each other can be further enhanced, and the wear resistance of the tire can further improve. In the present embodiment, in the center portion along the tread width direction, the amplitude may gradually increase from the opening side of the width direction sipe 4a, 4b toward the bottom side of the width direction sipe 4a, 4b, as long as the amplitude does not decrease from the opening side of the width direction sipe 4a, 4b toward the bottom side of the width direction sipe 4a, 4b. As an example, a region having a constant first amplitude can be formed closer to the opening side, and a region having a constant second amplitude larger than the first amplitude can be formed closer to the bottom side.

In the present disclosure, a plurality of width direction sipes 4a, 4b are arranged in the tread circumferential direction, and a ratio l/d of a sipe interval 1 in the tread circumferential direction between the width direction sipes 4a, 4b that are adjacent in the tread circumferential direction to a sipe depth d of each of the width direction sipes 4a, 4b preferably satisfies 2≤l/d≤4.

This is because if the ratio l/d is 2 or more, rigidity of the block piece partitioned by the width direction sipe can be obtained, and wear resistance can be obtained. On the other hand, if the ratio l/d is 4 or less, a number of sipes can be obtained, and a wet performance can be obtained.

In the present disclosure, the land portion 3 includes two shoulder land portions 3c, 3d located on outermost sides in the tread width direction, and internal land portions 3a, 3b located on inner sides of the two shoulder land portions 3c, 3d in the tread width direction, and a ratio Wc/Dc of a width Wc of each of the internal land portions 3a, 3b in the tread width direction to a tread gauge Dc of the internal land portion 3a, 3b preferably satisfies Wc/Dc≥3.

This is because if the ratio Wc/Dc is 3 or more, rigidity of the internal land portion 3a, 3b can be obtained, and the wear resistance can be further obtained.

In the present disclosure, the land portion 3 includes two shoulder land portions 3c, 3d located on the outermost sides in the tread width direction, and the internal land portions 3a, 3b located on the inner sides of the two shoulder land portions 3c, 3d in the tread width direction, and a ratio Ws/Ds of a width Ws of each of the shoulder land portions 3c, 3d in the tread width direction to a tread gauge Ds of the shoulder land portion 3c, 3d preferably satisfies Ws/Ds≥5.

This is because if the ratio Ws/Ds is 5 or more, rigidity of the shoulder land portion 3c, 3d can be obtained, and the wear resistance can be further obtained.

In the present disclosure, the land portion 3 includes two shoulder land portions 3c, 3d located on the outermost sides in the tread width direction, and the internal land portions 3a, 3b located on the inner sides of the two shoulder land portions 3c, 3d in the tread width direction. The tread gauge Dc of each of the internal land portions 3a, 3b and the tread gauge Ds of each of the shoulder land portions 3c, 3d are preferably 6.5 mm or less, and further preferably 6.0 mm or less. This is because in this range, the rigidities of the internal land portions 3a, 3b and the shoulder land portions 3c, 3d can be obtained, and the wear resistance can further improve.

As above, the embodiment of the present disclosure has been described, and the present disclosure is not limited to the above embodiment. For example, according to the above embodiment, the linear portion 41c, 41e of the width direction sipe 4a, 4b had a length in the depth direction increasing as the linear portion 41c, 41e extends from the center portion of the width direction sipe 4a, 4b in the tread width direction toward the opposite end portions in the tread width direction. However, the length of the width direction sipe 4a, 4b in the depth direction may increase from the center portion of the width direction sipe 4a, 4b in the tread width direction toward only either one end portion in the tread width direction. Furthermore, it is preferable to apply such a sipe shape as illustrated in FIG. 2 to all the land portions partitioned between the circumferential main grooves 2 (the land portions other than the outermost land portions in the tread width direction).

Furthermore, for example, in the land portion 3a, 3b, the width direction sipe 4a, 4b extends across the land portion 3a, 3b, but may terminate in the land portion 3a, 3b. Furthermore, the width direction sipe 4a, 4b may extend in the tread width direction in various shapes such as linear, curved and zigzag shapes.

Hereinafter, examples of the present disclosure will be described, but the present disclosure is not limited to the following examples.

EXAMPLES

To check effects of the present disclosure, tires according to an example of the present disclosure and a comparative example were experimentally produced, and a test to evaluate wear resistance was performed. Table 1 illustrates specifications of the respective tires together with evaluation results as follows.

<Wear Resistance>

Each of the tires according to the example of the present disclosure and the comparative example was mounted to a rim, charged with a prescribed internal pressure, mounted to a vehicle, and run on a dry road surface of a general road in various running modes. A wear amount of a block during a run along 40000 km was measured, and the wear resistance was evaluated from the measured wear amount. The evaluation result of the tire of the comparative example was set to 100, and index evaluation was performed. Table 1 illustrates the evaluation results. Note that Table 1 illustrates that a larger index indicates more excellent wear resistance.

TABLE 1

Figure 3:
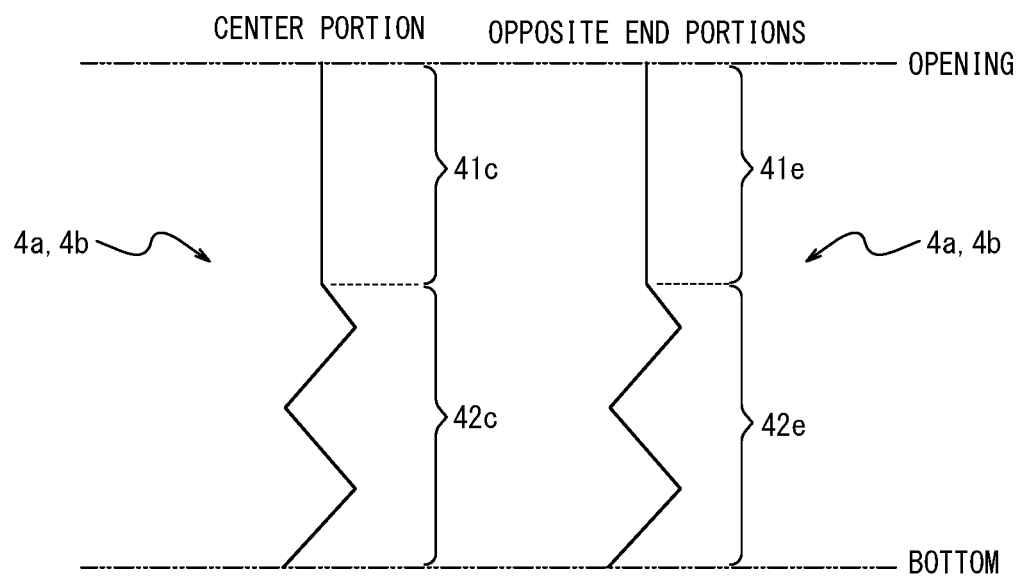
FIG. 3 illustrates respective cross-sectional shapes along a sipe depth direction, of a width direction sipe of a tire of a comparative example, in a center portion in a tread width direction and opposite end portions in the tread width direction.

| | | Example of the present disclosure | Comparative Example |
|---|---|---|---|
| Tread pattern | | FIG. 1 | FIG. 1 |
| Sipe shape | | FIG. 2 | FIG. 3 |
| Sipe width | | 0.3 mm | 0.4 mm |
| Sipe depth | | 5.5 mm | 3.9 mm |
| Tread width direction center portion | Linear portion length | 1.5 mm | 1.5 mm |
| | Number of apexes | 5 apexes | 3 apexes |
| | Amplitude | Gradually increase toward groove bottom side | Constant |
| Tread width direction opposite end portions | Linear portion length | 2 mm | 1.5 mm |
| | Number of apexes | 3 apexes | 3 apexes |
| | Amplitude | Constant | Constant |
| Wear resistance | | 104 | 100 |

As illustrated in Table 1, it is seen that the wear resistance of the tire of the example of the present disclosure is more improved than that of the tire of the comparative example.

REFERENCE SIGNS LIST 1 tread surface
2, 2a, 2b and 2c circumferential main groove
3, 3a, 3b, 3c and 3d land portion
4, 4a, 4b, 4c and 4d width direction sipe
41c and 41e linear portion
42c and 42e bent portion
5 and 6 width direction groove
TE tread edge
CL tire equatorial plane

The invention claimed is:

1. A pneumatic tire comprising, in a tread surface, two or more circumferential main grooves extending in a tread circumferential direction, and a land portion partitioned between the circumferential main grooves or by one of the circumferential main grooves and a tread edge, wherein
the land portion comprises a width direction sipe extending in a tread width direction,
the width direction sipe comprises, in a cross section along a depth direction, a linear portion extending from an opening of the width direction sipe toward a bottom of the width direction sipe, and a bent portion connected to the linear portion, bending and extending from a connecting portion with the linear portion to the bottom of the width direction sipe,
the linear portion of the width direction sipe has a length in the depth direction increasing as the linear portion extends from a center portion of the width direction sipe in the tread width direction toward an end portion in the tread width direction, and
wherein for the bent portion of the width direction sipe,
in the center portion of the width direction sipe in the tread width direction, an amplitude that is a distance between an extension line of the linear portion and the apex of the bent portion or an end portion of the width direction sipe on a bottom side varies to be larger on the bottom side of the width direction sipe than on an opening side of the width direction sipe, and
in the end portion of the width direction sipe in the tread width direction, the amplitudes are constant.

2. The pneumatic tire according to claim 1, wherein in the cross section along the depth direction,
the bent portion of the width direction sipe includes two or more apexes in the center portion of the width direction sipe in the tread width direction, and
in the end portion of the width direction sipe in the tread width direction, a number of apexes is smaller than a number of the apexes in the center portion in the tread width direction.

3. The pneumatic tire according to claim 2, wherein a plurality of the width direction sipes are arranged in a tread circumferential direction, and
a ratio l/d of a sipe interval 1 in the tread circumferential direction between the width direction sipes that are adjacent in the tread circumferential direction to a sipe depth d of each of the width direction sipes satisfies 2≤l/d≤4.

4. The pneumatic tire according to claim 2, wherein the land portion comprises two shoulder land portions located on outermost sides in the tread width direction, and internal land portions located on inner sides of the two shoulder land portions in the tread width direction, and
a ratio Wc/Dc of a width Wc of each of the internal land portions in the tread width direction to a tread gauge Dc of the internal land portion satisfies Wc/Dc≥3.

5. The pneumatic tire according to claim 2, wherein the land portion comprises two shoulder land portions located on outermost sides in the tread width direction, and internal land portions located on inner sides of the two shoulder land portions in the tread width direction, and
a ratio Ws/Ds of a width Ws of each of the shoulder land portions in the tread width direction to a tread gauge Ds of the shoulder land portion satisfies Ws/Ds≥5.

6. The pneumatic tire according to claim 2, wherein the land portion comprises two shoulder land portions located on outermost sides in the tread width direction, and internal land portions located on inner sides of the two shoulder land portions in the tread width direction,
a tread gauge Dc of each of the internal land portions and a tread gauge Ds of each of the shoulder land portions are 8.5 mm or less.

7. The pneumatic tire according to claim 1, wherein a plurality of the width direction sipes are arranged in a tread circumferential direction, and a ratio $l/d$ of a sipe interval $l$ in the tread circumferential direction between the width direction sipes that are adjacent in the tread circumferential direction to a sipe depth $d$ of each of the width direction sipes satisfies $2 \leq l/d \leq 4$.

8. The pneumatic tire according to claim 7, wherein the land portion comprises two shoulder land portions located on outermost sides in the tread width direction, and internal land portions located on inner sides of the two shoulder land portions in the tread width direction, and a ratio $Wc/Dc$ of a width $Wc$ of each of the internal land portions in the tread width direction to a tread gauge $Dc$ of the internal land portion satisfies $Wc/Dc \geq 3$.

9. The pneumatic tire according to claim 7, wherein the land portion comprises two shoulder land portions located on outermost sides in the tread width direction, and internal land portions located on inner sides of the two shoulder land portions in the tread width direction, and a ratio $Ws/Ds$ of a width $Ws$ of each of the shoulder land portions in the tread width direction to a tread gauge $Ds$ of the shoulder land portion satisfies $Ws/Ds \geq 5$.

10. The pneumatic tire according to claim 7, wherein the land portion comprises two shoulder land portions located on outermost sides in the tread width direction, and internal land portions located on inner sides of the two shoulder land portions in the tread width direction, a tread gauge $Dc$ of each of the internal land portions and a tread gauge $Ds$ of each of the shoulder land portions are 8.5 mm or less.

11. The pneumatic tire according to claim 1, wherein the land portion comprises two shoulder land portions located on outermost sides in the tread width direction, and internal land portions located on inner sides of the two shoulder land portions in the tread width direction, and a ratio $Wc/Dc$ of a width $Wc$ of each of the internal land portions in the tread width direction to a tread gauge $Dc$ of the internal land portion satisfies $Wc/Dc \geq 3$.

12. The pneumatic tire according to claim 11, wherein the land portion comprises two shoulder land portions located on outermost sides in the tread width direction, and internal land portions located on inner sides of the two shoulder land portions in the tread width direction, and a ratio $Ws/Ds$ of a width $Ws$ of each of the shoulder land portions in the tread width direction to a tread gauge $Ds$ of the shoulder land portion satisfies $Ws/Ds \geq 5$.

13. The pneumatic tire according to claim 1, wherein the land portion comprises two shoulder land portions located on outermost sides in the tread width direction, and internal land portions located on inner sides of the two shoulder land portions in the tread width direction, and a ratio $Ws/Ds$ of a width $Ws$ of each of the shoulder land portions in the tread width direction to a tread gauge $Ds$ of the shoulder land portion satisfies $Ws/Ds \geq 5$.

14. The pneumatic tire according to claim 1, wherein the land portion comprises two shoulder land portions located on outermost sides in the tread width direction, and internal land portions located on inner sides of the two shoulder land portions in the tread width direction, a tread gauge $Dc$ of each of the internal land portions and a tread gauge $Ds$ of each of the shoulder land portions are 8.5 mm or less.

* * * * *